(12) United States Patent
Vela, Jr.

(10) Patent No.: US 6,257,211 B1
(45) Date of Patent: Jul. 10, 2001

(54) ENGINE COOLING DEVICE

(76) Inventor: Florencio Vela, Jr., 314 Rodriguez St., Shaffer, CA (US) 93263-2540

( * ) Notice: Subject to any disclaimer, the term of this patent is extended or adjusted under 35 U.S.C. 154(b) by 0 days.

(21) Appl. No.: 09/616,798

(22) Filed: Jul. 14, 2000

(51) Int. Cl.[7] .................................................... F02D 19/00
(52) U.S. Cl. ............................................................ 123/542
(58) Field of Search .................................... 123/542, 540

(56) References Cited

U.S. PATENT DOCUMENTS

| | | | |
|---|---|---|---|
| 4,441,476 | * | 4/1984 | Roberts et al. ........................ 123/542 |
| 5,871,001 | * | 2/1999 | Pelkey .................................. 123/542 |
| 6,182,643 | * | 2/2001 | Canopy ................................ 123/542 |

* cited by examiner

*Primary Examiner*—Marguerite McMahon
(74) *Attorney, Agent, or Firm*—Goldstein Law Offices P.C

(57) ABSTRACT

An engine cooling device including a housing having an inlet tube extending outwardly of a front wall thereof and an outlet tube extending outwardly of a back wall thereof. The inlet tube is couple with an air intake of a vehicle. The outlet tube is coupled with an air intake of an engine of the vehicle. The housing holds a quantity of water therein. A water pump is disposed within the enlarged rear section of the housing. A plurality of water sprays are secured to an interior surface of an upper wall of the housing. The water sprays are in communication with the water pump. An air filter is angularly disposed within the housing above the air inlet and below the air outlet.

4 Claims, 2 Drawing Sheets

ENGINE COOLING DEVICE

BACKGROUND OF THE INVENTION

The present invention relates to an engine cooling device and more particularly pertains to delivering cooled air to an engine of a vehicle to prevent overheating and better performance.

The overheating of vehicles is due to the overworking of the radiator in order to keep the engine cool. Sometimes the radiator becomes so overworked that it is virtually drained of all water and starts to smoke resulting in the driver having to add water or coolant to the radiator in order to avoid any damage from occurring to the engine. What is needed is a device that will separately cool the engine directly without the aid of the radiator.

The present invention attempts to solve the abovementioned problem by providing a device that will deliver cooled air directly into the air intake of the engine thereby alleviating some of the overworking of the radiator that normally works to keep the engine in a cool and effective working condition.

The use of air conditioning devices is known in the prior art. More specifically, air conditioning devices heretofore devised and utilized for the purpose of delivering cooled air are known to consist basically of familiar, expected and obvious structural configurations, notwithstanding the myriad of designs encompassed by the crowded prior art which have been developed for the fulfillment of countless objectives and requirements.

While these devices fulfill their respective, particular objective and requirements, these patents do not describe an engine cooling device for delivering cooled air to an engine of a vehicle to prevent overheating and better performance.

In this respect, the engine cooling device according to the present invention substantially departs from the conventional concepts and designs of the prior art, and in doing so provides an apparatus primarily developed for the purpose of delivering cooled air to an engine of a vehicle to prevent overheating and better performance.

Therefore, it can be appreciated that there exists a continuing need for new and improved engine cooling device which can be used for delivering cooled air to an engine of a vehicle to prevent overheating. In this regard, the present invention substantially fulfills this need.

SUMMARY OF THE INVENTION

In the view of the foregoing disadvantages inherent in the known types of air conditioning devices now present in the prior art, the present invention provides an improved engine cooling device. As such, the general purpose of the present invention, which will be described subsequently in greater detail, is to provide a new and improved engine cooling device and method which has all the advantages of the prior art and none of the disadvantages.

To attain this, the present invention essentially comprises a housing having a generally rectangular configuration. The housing has an inlet tube extending outwardly of a front wall thereof and an outlet tube extending outwardly of a back wall thereof. The inlet tube is coupled with an air intake of a vehicle. The outlet tube is coupled with an air intake of an engine of the vehicle. The housing has an enlarged rear section. A lower portion of the enlarged rear section has a drain plug in communication therewith. The housing holds a quantity of water therein. A water pump is disposed within the enlarged rear section of the housing. The water pump has an activation switch disposed within the housing. The activation switch is in communication with a battery of the vehicle. A plurality of water sprays are secured to an interior surface of an upper wall of the housing. The water sprays are in communication with the water pump. An air filter is angularly disposed within the housing above the air inlet and below the air outlet.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved engine cooling device which has all the advantages of the prior art air conditioning devices and none of the disadvantages.

It is another object of the present invention to provide a new and improved engine cooling device which may be easily and efficiently manufactured and marketed.

It is a further object of the present invention to provide a new and improved engine cooling device which is of durable and reliable construction.

An even further object of the present invention is to provide a new and improved engine cooling device which is susceptible of a low cost of manufacture with regard to both materials and labor, and which accordingly is then susceptible of low prices of sale to the consuming public, thereby making such an engine cooling device economically available to the buying public.

Even still another object of the present invention is to provide a new and improved engine cooling device for delivering cooled air to an engine of a vehicle to prevent overheating and better performance.

Lastly, it is an object of the present invention to provide a new and improved engine cooling device including a housing having an inlet tube extending outwardly of a front wall thereof and an outlet tube extending outwardly of a back wall thereof. The inlet tube is coupled with an air intake of a vehicle. The outlet tube is coupled with an air intake of an engine of the vehicle. The housing holds a quantity of water therein. A water pump is disposed within the enlarged rear section of the housing. A plurality of water sprays are secured to an interior surface of an upper wall of the housing. The water sprays are in communication with the water pump. An air filter is angularly disposed within the housing above the air inlet and below the air outlet.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
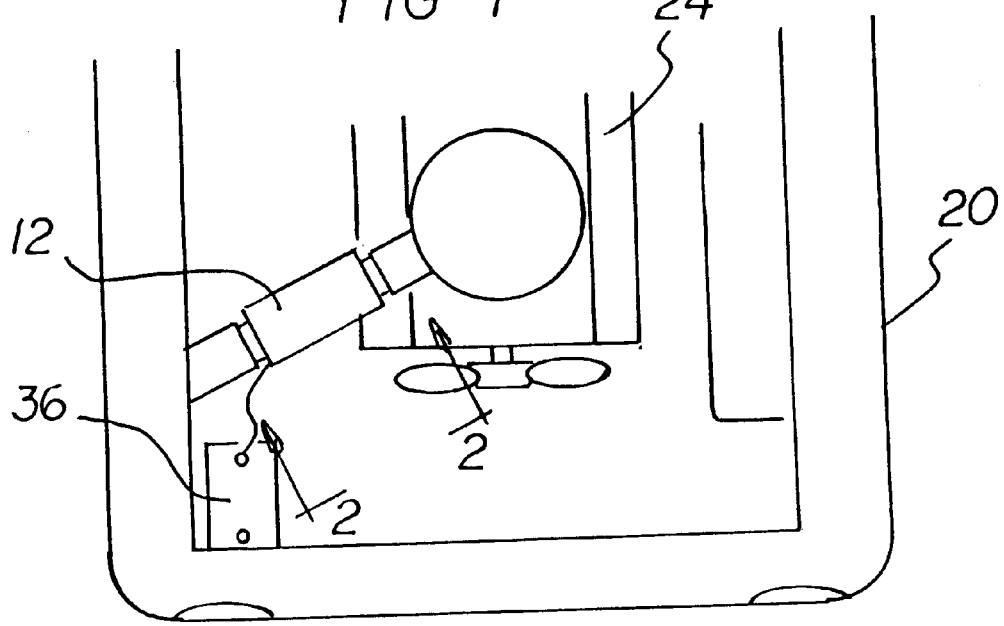
FIG. 1 is a perspective view of the preferred embodiment of the engine cooling device constructed in accordance with the principles of the present invention.
Figure 2:
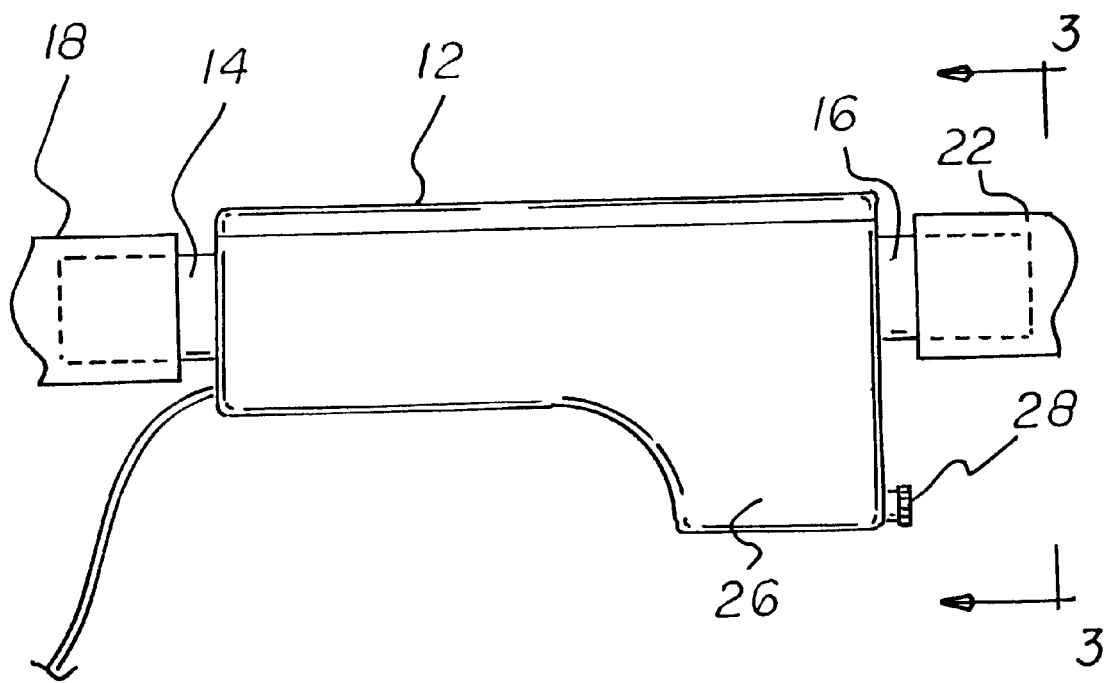
FIG. 2 is a side view of the present invention as taken along line 2—2 of FIG. 1.
Figure 3:
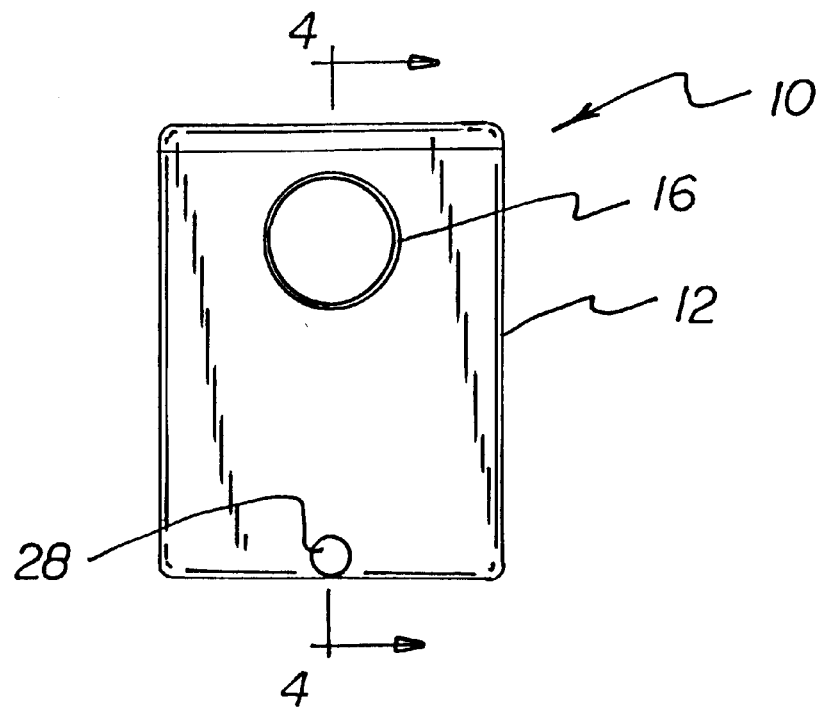
FIG. 3 is an end view of the present invention as taken along line 3—3 of FIG. 2.
Figure 4:
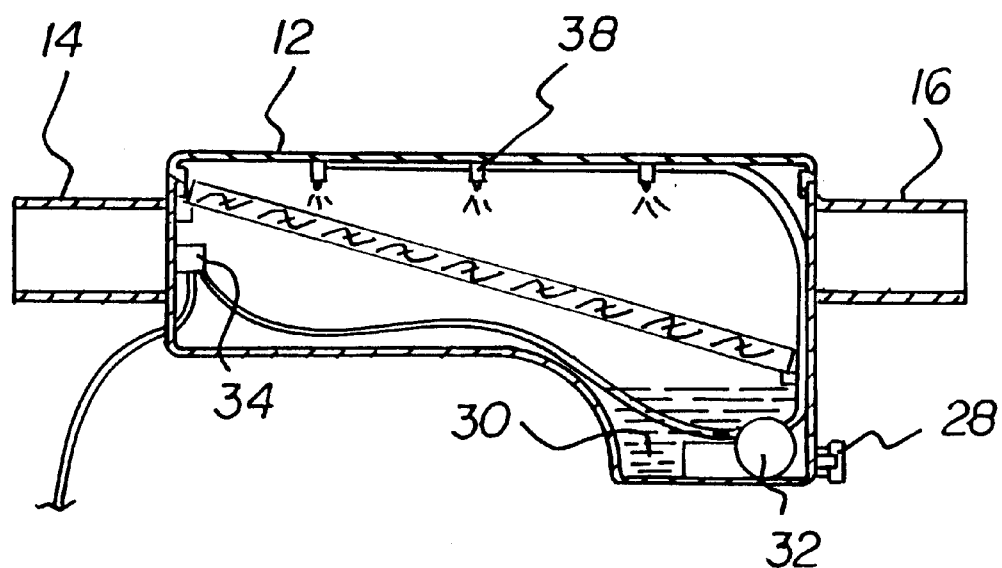
FIG. 4 is a cross-sectional view of the present invention as taken along line 4—4 of FIG. 3.

With reference now to the drawings, and in particular, to FIGS. 1 through 4 thereof, the preferred embodiment of the new and improved engine cooling device embodying the principles and concepts of the present invention and generally designated by the reference number 10 will be described.

Specifically, it will be noted in the various Figures that the device relates to a engine cooling device for delivering cooled air to an engine of a vehicle to prevent overheating. In its broadest context, the device consists of a housing, a water pump, a plurality of water sprays, and an air filter. Such components are individually configured and correlated with respect to each other so as to attain the desired objective.

The housing 12 has a generally rectangular configuration. The housing 12 has an inlet tube 14 extending outwardly of a front wall thereof and an outlet tube 16 extending outwardly of a back wall thereof. The inlet tube 14 is coupled with an air intake 18 of a vehicle 20. The outlet tube 16 is coupled with an air intake 22 of an engine 24 of the vehicle 20. The housing 12 has an enlarged rear section 26. A lower portion of the enlarged rear section 26 has a drain plug 28 in communication therewith. The housing 12 holds a quantity of water 30 therein.

The water pump 32 is disposed within the enlarged rear section 26 of the housing 12. The water pump 32 has an activation switch 34 disposed within the housing 12. The activation switch 34 is in communication with a battery 36 of the vehicle 20.

The plurality of water sprays 38 are secured to an interior surface of an upper wall of the housing 12. The water sprays 38 are in communication with the water pump 32.

The air filter 40 is angularly disposed within the housing 12 above the air inlet 14 and below the air outlet 16.

In use, air is received within the housing 12 through the air inlet 14. The air passes through the air filter 40, which is continuously moistened by the water sprays 38 which shower the water 30 thereon as it is pumped by the water pump 32. The activation switch 34 will allow the water pump 32 to be turned on and off either automatically or manually. The moistened air filter 40 will cool the air taken into the housing 12 through the air inlet 14 and allow the cooled air to pass out through the air outlet 16 to be delivered into the engine for cooling purposes.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An engine cooling device for delivering cooled air to an engine of a vehicle to prevent overheating comprising, in combination:

a housing having a generally rectangular configuration, the housing having an inlet tube extending outwardly of a front wall thereof and an outlet tube extending outwardly of a back wall thereof, the inlet tube being coupled with an air intake of a vehicle, the outlet tube being coupled with an air intake of an engine of the vehicle, the housing having an enlarged rear section, a lower portion of the enlarged rear section having a drain plug in communication therewith, the housing holding a quantity of water therein;

a water pump disposed within the enlarged rear section of the housing, the water pump having an activation switch disposed within the housing, the activation switch being in communication with a battery of the vehicle;

a plurality of water sprays secured to an interior surface of an upper wall of the housing, the water sprays being in communication with the water pump;

an air filter angularly disposed within the housing above the air inlet and below the air outlet.

2. An engine cooling device for delivering cooled air to an engine of a vehicle to prevent overheating comprising, in combination:

a housing having an inlet tube extending outwardly of a front wall thereof and an outlet tube extending outwardly of a back wall thereof, the inlet tube being coupled with an air intake of a vehicle, the outlet tube being coupled with an air intake of an engine of the vehicle, the housing holding a quantity of water therein;

a water pump disposed within the housing;

a plurality of water sprays secured to an interior surface of an upper wall of the housing, the water sprays being in communication with the water pump;

an air filter angularly disposed within the housing above the air inlet and below the air outlet.

3. The engine cooling device as set forth in claim 2 wherein the housing has an enlarged rear section with water pump disposed therein, a lower portion of the enlarged rear section having a drain plug in communication therewith.

4. The engine cooling device as set forth in claim 2 wherein the water pump has an activation switch disposed within the housing, the activation switch is in communication with a battery of the vehicle.

* * * * *